US009053202B2

(12) United States Patent
Viswanadha et al.

(10) Patent No.: US 9,053,202 B2
(45) Date of Patent: Jun. 9, 2015

(54) APPARATUS AND METHODS FOR USER GENERATED TRANSLATION

(75) Inventors: Raghuram Viswanadha, Milpitas, CA (US); Bart F. Teeuwisse, Soquel, CA (US); Benedicto de Souza Franco, Jr., Sunnyvale, CA (US); Curtis Harvey, Brooklyn, NY (US)

(73) Assignee: Yahoo! Inc., Sunnyvale, CA (US)

( * ) Notice: Subject to any disclaimer, the term of this patent is extended or adjusted under 35 U.S.C. 154(b) by 1249 days.

(21) Appl. No.: 12/567,714

(22) Filed: Sep. 25, 2009

(65) Prior Publication Data

US 2011/0077935 A1 Mar. 31, 2011

(51) Int. Cl.
*G06F 17/28* (2006.01)
*G06F 17/30* (2006.01)

(52) U.S. Cl.
CPC .......... *G06F 17/30899* (2013.01); *G06F 17/28* (2013.01)

(58) Field of Classification Search
CPC ............................ G06F 17/28; G06F 17/30899
USPC .......................................... 704/2, 3, 4, 5, 7, 8
See application file for complete search history.

(56) References Cited

U.S. PATENT DOCUMENTS

| | | | | |
|---|---|---|---|---|
| 6,161,082 A * | 12/2000 | Goldberg et al. | | 704/3 |
| 6,950,501 B1 * | 9/2005 | Chaturvedi et al. | | 379/52 |
| 7,107,204 B1 * | 9/2006 | Liu et al. | | 704/2 |
| 7,197,459 B1 * | 3/2007 | Harinarayan et al. | | 704/270.1 |
| 7,283,950 B2 * | 10/2007 | Pournasseh et al. | | 704/8 |
| 2002/0169592 A1 * | 11/2002 | Aityan | | 704/2 |
| 2004/0133417 A1 * | 7/2004 | Azuma | | 704/8 |
| 2004/0205671 A1 * | 10/2004 | Sukehiro et al. | | 715/532 |
| 2004/0205674 A1 * | 10/2004 | Delgado et al. | | 715/536 |
| 2005/0075858 A1 * | 4/2005 | Pournasseh et al. | | 704/2 |
| 2007/0219782 A1 * | 9/2007 | Li | | 704/10 |
| 2007/0294076 A1 * | 12/2007 | Shore et al. | | 704/2 |
| 2008/0097743 A1 * | 4/2008 | Hong et al. | | 704/3 |
| 2008/0120088 A1 * | 5/2008 | Schurig | | 704/2 |
| 2008/0147378 A1 * | 6/2008 | Hall | | 704/4 |
| 2008/0172219 A1 * | 7/2008 | Thomas | | 704/8 |
| 2008/0177528 A1 * | 7/2008 | Drewes | | 704/2 |
| 2008/0195372 A1 * | 8/2008 | Chin et al. | | 704/2 |
| 2009/0119091 A1 * | 5/2009 | Sarig | | 704/2 |
| 2009/0198487 A1 * | 8/2009 | Wong et al. | | 704/4 |

OTHER PUBLICATIONS

Shimohata et al., "Collaborative Translation Environment on the Web", Proceeding of the Machine Translation, 2001.*

(Continued)

*Primary Examiner* — Jialong He
(74) *Attorney, Agent, or Firm* — Weaver Austin Villeneuve & Sampson LLP

(57) ABSTRACT

Disclosed are methods and apparatus for enabling user communities around the world to engage in translation of web properties while using such web properties. In certain embodiments, a translation interface is provided with a served web property to allow users to submit translations for user interface (UI) strings from a particular property interface. While a user is engaging with the web property, the interface can also enable in-context editing and submission of translations. For example, translation submission can be presented as a replacement for the translated text within the page that is being rendered to the translator user. Certain interface embodiments also are configured to allow the user community to give feedback on the submitted translations.

24 Claims, 8 Drawing Sheets

(56) References Cited

OTHER PUBLICATIONS

Perrino, "User-generated Translation: The future of translation in a Web 2.0 environment", The Journal of Specialised Translation, Jul. 2009.*

DePalma et al. "Translation of, for, and by the People", Published by Common Sence Advisory, Inc. Dec. 2008.*

Facebook Translation Application: http://www.facebook.com/applications/#/translations/ http://www.insidefacebook.com/2008/04/02/now-you-can-help-translate-facebook-into-any-language.

Hi5 Translation Tool: http://www.hi5networks.com/developer/2008/09/translation-service-for-openso.html http://www.insidefacebook.com/2008/05/21/hi5-launching-crowd-sourced-translation-service-for-hi5-and-apps/.

KickApps Translation Tool: http://www.centernetworks.com/kickapps-foreign-language-localization, Sep. 25, 2008.

Drupal Translation Tool: http://www.screencast.com/users/yfhahn/folders/Jing/Media/4e0d7103-04a4-43e8-a320-777748d03317 http://www.slideshare.net/gabor.hojtsy/multilingual-drupal-presentation-from-do-it-with-drupal-presentation, Dec. 12, 2008.

WordPress Translation Plugin: http://transposh.org, Apr. 11, 2010.

Google Translator Toolkit: http://blogoscoped.com/archive/2009-06-09-n19.html.

* cited by examiner

APPARATUS AND METHODS FOR USER GENERATED TRANSLATION

BACKGROUND OF THE INVENTION

The present invention is related to techniques and mechanisms for providing translations with respect to user accessible web sites or web properties.

Service providers have rapidly expanded into many areas that allow users to interact with various resources and other users in a multitude of ways. For example, users may store and share photographs and video through a dedicated photo sharing web property. In another brief example, users may obtain and share news on a dedicated news related web property.

Service providers are constantly striving to increase the reach of their respective web properties. In order to reach a heterogeneous mix of people who speak different languages, developers continue to spend a significant amount of development time so as to customize web properties for specific languages. Improved mechanisms for deploying web properties in different languages would be beneficial.

SUMMARY OF THE INVENTION

Apparatus and methods for enabling user communities around the world to engage in translation of web properties while using such web properties are provided. In certain embodiments, a translation interface is configured to allow users to submit translations for user interface (UI) strings from a particular property interface. While a user is engaging with the web property, the interface can also enable in-context editing and submission of translations. For example, translation submission can be presented as a replacement for the translated text within the page that is being rendered to the translator user. Certain interface embodiments also are configured to allow the user community to give feedback on the submitted translations.

In certain embodiments, a method of facilitating user generated translations is disclosed. In response to a user using a particular web property, wherein such user is authorized to provide translations for such particular web property, a response for rendering one or more web pages with a plurality of translatable text strings is provided so that the rendered one or more web pages include a translation interface for receiving translations of the translatable text strings. In response to receiving a first translation of a first one of the translatable text strings into a first language through the translation interface, a response for presenting the first translation as a replacement for the first translatable text string is within the rendered one or more web pages is also provided.

In a further aspect, in response to receiving the first translation, the first translation is sent to a central server that is configured to publish the first translation to other users of the particular web property (e.g., if such first translation passes a vetting or review process). In another implementation, in response to receiving a request for reviewing other translations of a second one of the text strings from other users into the first selected language, a response for presenting the other translations through the translation interface is also provided. In a specific embodiment, the translation interface is further configured to receive a vote for a selected one of the other translations as being a best translation for the second selected text string.

In a further aspect, in response to the user using the particular web property, wherein such user is authorized to provide translations for such particular web property, a response for presenting a second translation for a second one of the text strings as a replacement for the second text string within the rendered one or more web pages is provided. The second translation is a best translation of a plurality of translations provided by a plurality of users of the particular web property. In a further aspect, the second text string is associated with a variable and the second translation is based at least in part on a current value of the variable for the rendered one or more web pages. In yet a further aspect, the response for presenting the second translation includes a plurality of alternative translation strings, a position and type indicator for the current value of the variable, and information that specifies which alternative translation string to present as the second translation based at least in part on the current value of the variable.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with specific embodiments, it will be understood that it is not intended to limit the invention to these embodiments. On the contrary, the invention is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Certain embodiments of the present invention enable user communities around the world to engage in translation of web properties while using such web properties. That is, users are able to submit translations for user interface (UI) strings from the same property interface. Specific embodiments provide a translation interface for users to submit translations. While a user is engaging with the web property, the interface can enable in-context editing and submission of translations. For example, translation submission can be presented as a replacement for the translated text within the page that is being rendered to the translator user. Since the user can then immediately view how the submitted translation will be used in the final product, the user can edit the submission based on the context to then improve the quality of submitted translations. Thus, social properties that boast a loyal user base, e.g.: Flickr, Upcoming, Groups, etc., can engage the existing user base to obtain quality translations that can then be used to extend the social properties to new user groups.

Certain embodiments allow the user community to give feedback on the submitted translations. These democratically selected "best" translations can then be promoted as a part of a new production system after vetting such translations by a product developer manager. All of the property's functionality may remain accessible while collecting translations and user feedback. Adequate safe guards can also be provided for abuse and spam prevention. A portal may also be provided for translators to interact with each other.

Figure 1:
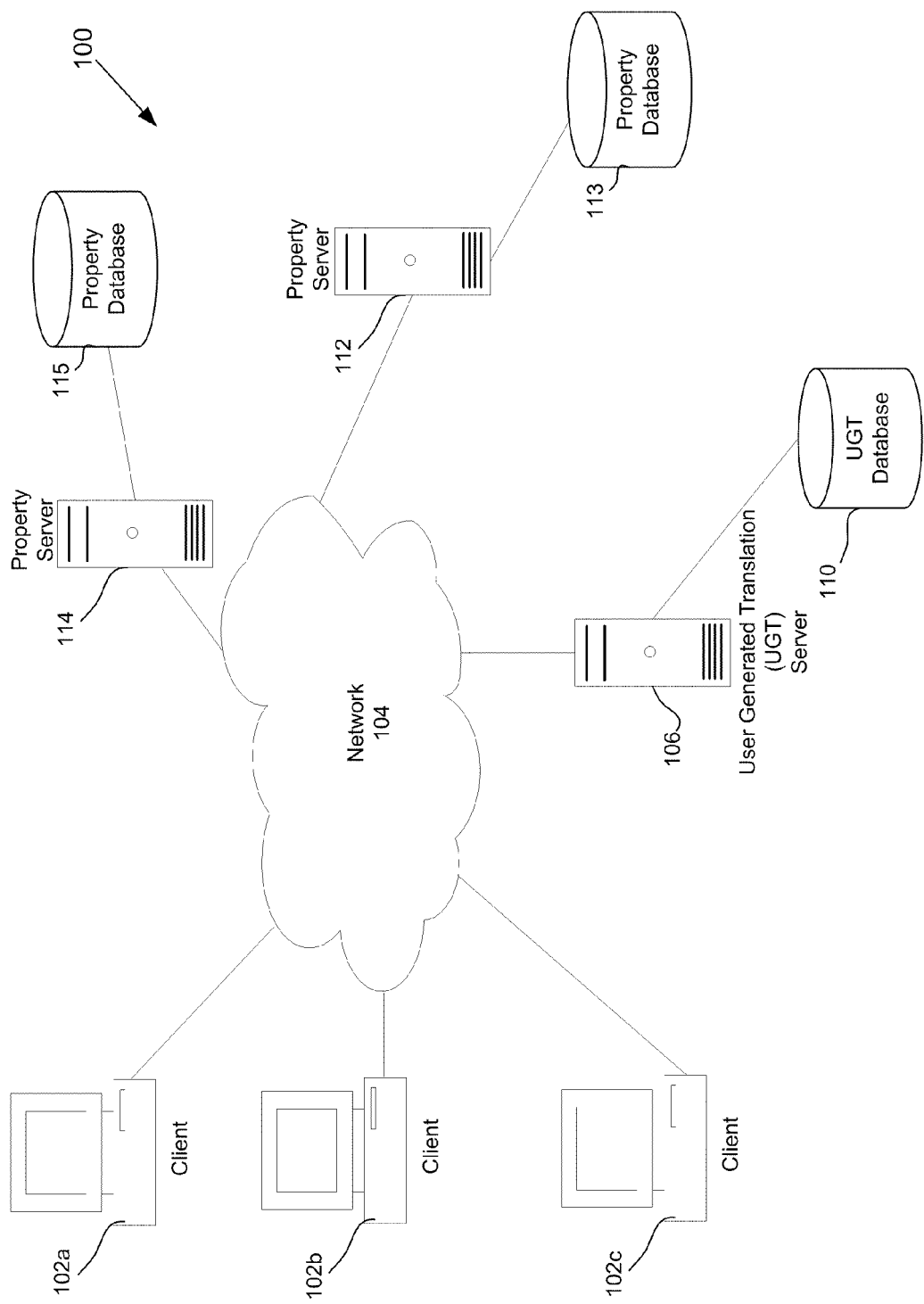
FIG. 1 illustrates an example network segment in which the present invention may be implemented in accordance with one embodiment of the present invention.

Prior to describing detailed mechanisms for facilitating user generated translations, a high level computer network environment will first be briefly described to provide an example context for practicing techniques of the present invention. FIG. 1 illustrates an example network segment 100 in which the present invention may be implemented in accordance with one embodiment of the present invention. As shown, a plurality of clients (e.g., 102a~102c) may access a property application, for example, via one or more property servers 112 or 114 via network 104.

The network may take any suitable form, such as a wide area network or Internet and/or one or more local area networks (LAN's). The network 104 may include any suitable number and type of devices, e.g., routers and switches, for forwarding web property requests from each client to the web application and forwarding web property results back to the requesting clients or for forwarding data between various servers.

Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Embodiments of the present invention include a user generated translation (UGT) system that is configurable to manage translations that are provided by users accessing web properties. The UGT system may be implemented within one or more web property servers, clients, and/or a centralized UGT server 106.

Figure 2:
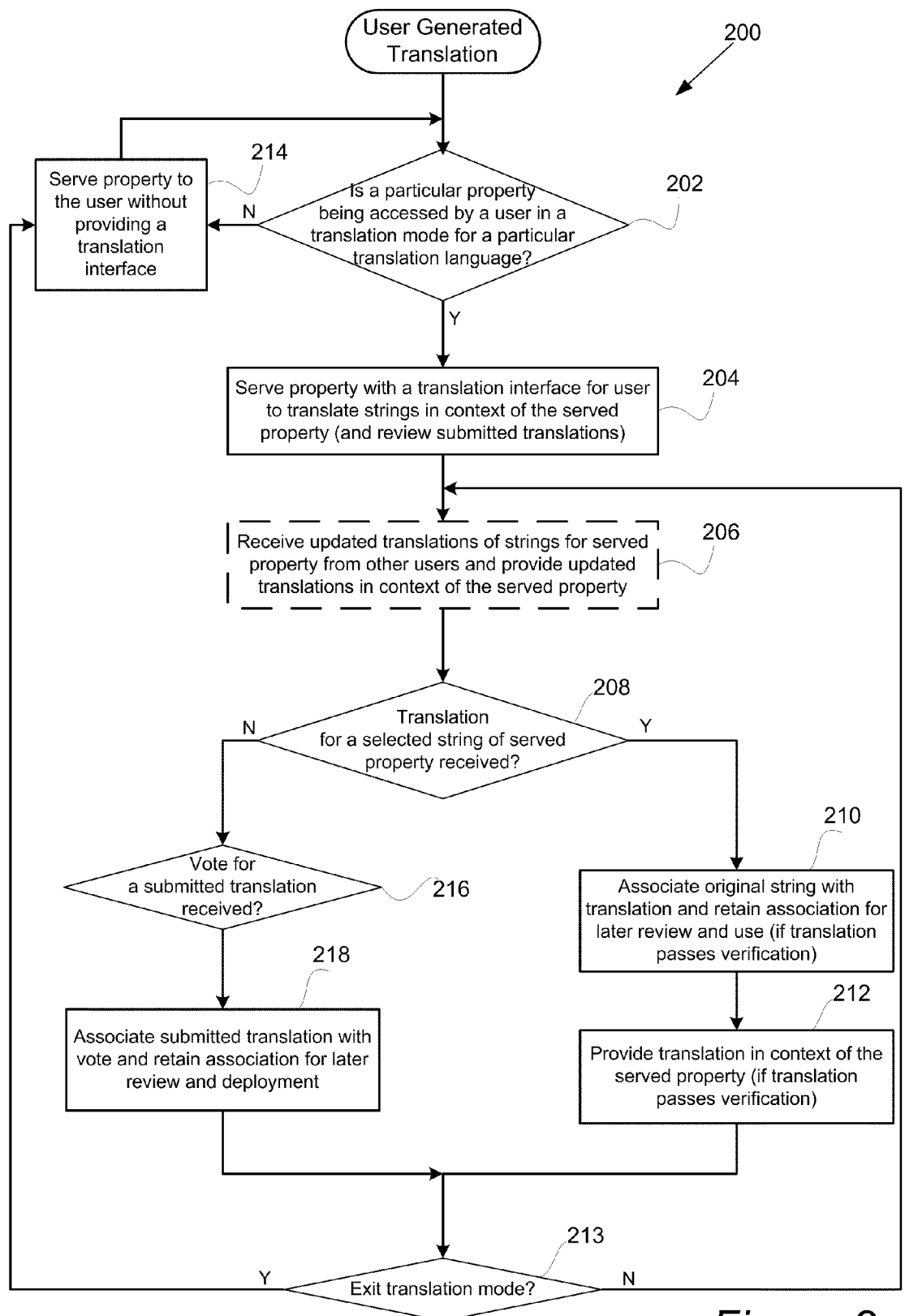
FIG. 2 is a flowchart illustrating a user generated translation procedure in accordance with one embodiment of the present invention.

FIG. 2 is a flowchart illustrating a user generated translation (UGT) procedure 200 in accordance with one embodiment of the present invention. The illustrated UGT procedure 200 is described with respect to a single user's interactions with a particular web property. However, it will become readily apparent that this procedure is not customized to a particular type of property and, therefore, can be readily applied to a diverse number and type of web properties. Additionally, the following procedure incorporates mechanisms for users to share and review translations from each other.

Referring to the illustrated procedure of FIG. 2, it may initially be determined whether a property is being accessed by a user (e.g., potential translator) in a translation mode for a particular language in operation 202. For example, when a user initially accesses a property, such as Flickr, the web property server may be configured to serve the property's home page along with a pop-up window that includes an input mechanism, such as radio buttons or pull down menus, for the user to activate a translation mode in a particular language with respect to the particular property. For example, a property developer may decide to request users of a particular property who are being served in English to participate in translating such property to a set of new languages, such as Dutch and French. Accordingly, the property servers may be configured to cause requests to be presented to users (or a selected set of users) of such property. For instance, such property servers may be configured to serve users with a plurality of selectable languages, including French and Dutch, in which a translation mode may be activated. The presented requests may alternatively ask the selected users whether they wish to activate a translation mode for translating a specific language property, such as Dutch.

In certain implementations, the UGT procedure may allow all users of the particular property to participate in translation mode. Alternatively, users may be authorized for translation mode based on any suitable criteria. The criteria may include one or more of the following factors: whether the user has registered with a UGT process, whether the user has certain qualifications (e.g., education level, residency, etc.), historical user ratings or scores, etc.

If a user has not selected a translation mode, the particular property may be served (or continue to be served) to the user without providing a translation interface in operation 214 and the UGT procedure may continue to wait for the translation mode to be activated by the user. Optionally, the particular property server may be configured to repeatedly serve a selectable translation option to the user. Alternatively, such translation mode option may be presented to the user a fixed number of times or accessible at any time via the served property interface.

Figure 3:
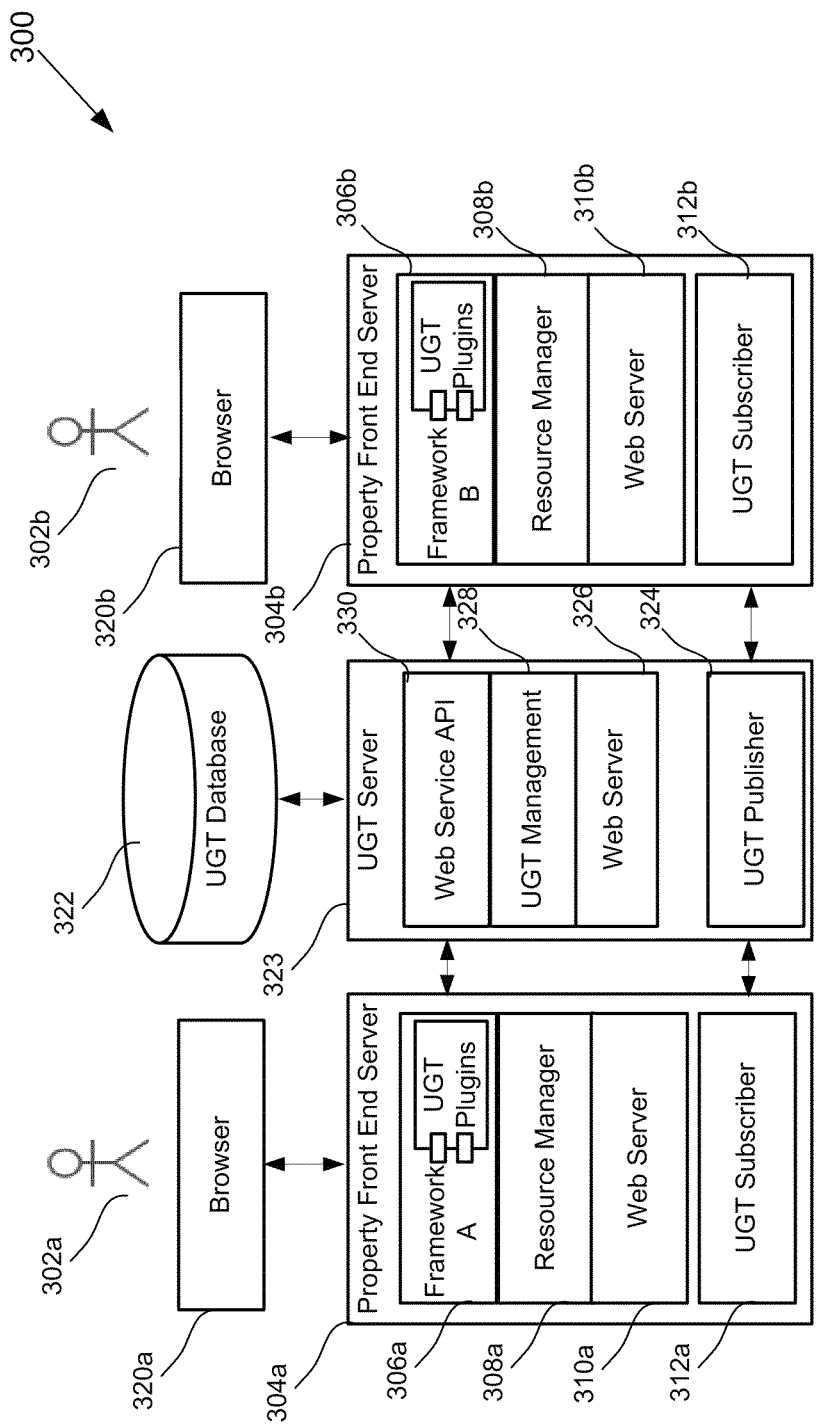
FIG. 3 is a diagrammatic illustration of a detailed architecture for a UGT system in accordance with a specific implementation of the present invention.

If the user selects translation mode, the property may then be served with a translation interface for the user to translate strings in context of such served property (and review submitted translation) in operation 204. Any suitable architecture may be utilized to detect a particular property's user interactions and incorporate one or more translation interfaces into such user interactions. FIG. 3 is a diagrammatic illustration of a detailed architecture for a UGT system in accordance with a specific implementation of the present invention. In this implementation, a user (e.g., 302a or 302b) may interact with a particular property via one or more property front end server (e.g., 304a or 304b), which are UGT enabled, through a client browser (e.g., 320a or 320b). Each property server may also include a web server module (310a or 310b) for providing server functionality.

In one example, the browser sends requests for a particular HTML (hypertext mark up language) document to a property server, receives responses from the property server, and renders such responses into one or more web pages, which includes text, images, videos, and links, and/or interactive modules (e.g., JavaScript or AJAX modules, etc.).

Each UGT enabled property server may also include a presentation framework (e.g., 306a or 306b) that is integrated with one or more UGT plug-ins. In general, each framework provides a standardized way (e.g., the Maple framework available from Yahoo! of Sunnyvale, Calif. or the Symfony framework available as an open source framework from Sensio Labs of Clichy Cedex, France, to generate outgoing responses for incoming requests for the particular web property. Each UGT plug-in may be configured to intercept responses generated by a particular framework so as to provide additional instrumentation for the translation interface with such response prior to sending to the requesting user. If a particular framework does not allow plug-ins, a UGT proxy for routing responses may alternatively be provided.

When a user requests access to a particular property server in translation mode, the UGT plug-in or proxy is operable to provide a translation interface with the served property (if authorized and if translation mode is activated). The one or more translation interface mechanisms are configured to allow the user to translate specific portions of the served web property.

Figure 4A:
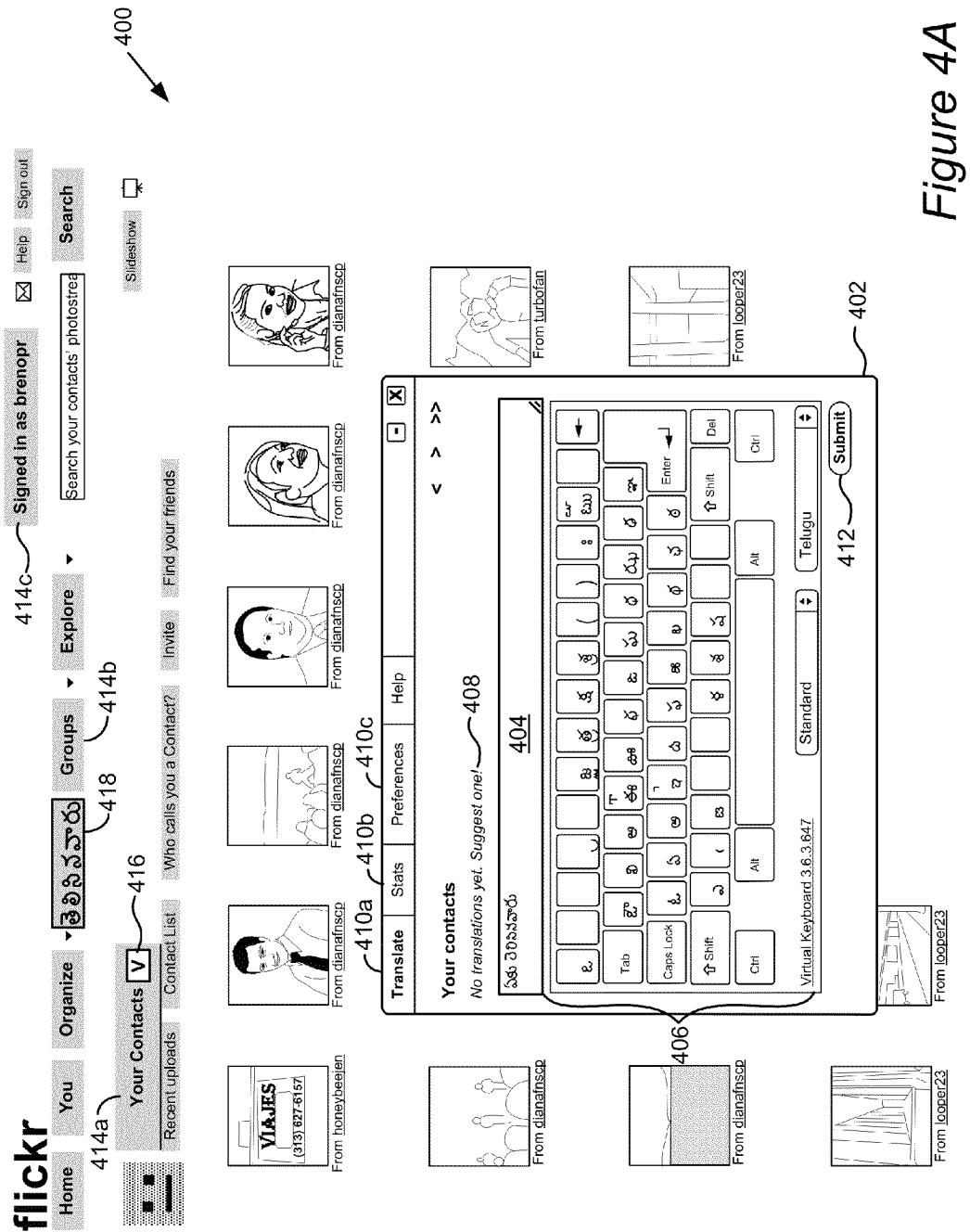
FIG. 4A is a screen shot of a particular page of photograph management and sharing property with an activated translation mode in accordance with an example implementation of the present invention.

A translation interface may take any suitable form. For instance, a translation interface may indicate which phrases or strings on the served web page are selectable and translatable. FIG. 4A is a screen shot of a particular page 400 of photograph management and sharing property "Flickr" (available from Yahoo! of Sunnyvale, Calif.) after a user has selected translation mode for the language Telugu in accordance with an example implementation of the present invention. As shown, translatable phrases, such as "Your Contacts" 414a, "Groups" 414b, and "Signed in as brenopr" are highlighted. Note that the last phrase "Signed in as brenopr" contains a value "brenopr" for a user variable, while the other example phrases do not pertain to variables. In the later case, the user will not translate the variable value itself, but may provide information regarding how the variable value is handled with respect to a translation as described further below.

Although each translatable phrase is highlighted, the user may interact with the normal operations of the presented page, including functionality associated with one or more of the translatable phrases. That is, one or more of the translatable phrases may be associated with interactive mechanisms. For example, a user may still click on the "Your Contacts" link 414a, which also corresponds to a translatable phrase, and a new "Your Contacts" page, along with one or more translation interfaces, may then be presented to the user.

Each translatable phrase may be displayed with a selection mechanism for initiating translation of such translatable phrase. For example, each translatable phrase may be associated with a selection icon, e.g., 416. Only selection icon 416 for phrase "Your Contacts" 414a is illustrated although each translatable phrase may contain a selection icon. In one embodiment, a selection icon appears when the user hovers a mouse or pointing device over a translatable phrase. The user may then select (or click) the icon to indicate selection of such translatable phrase. Alternatively, each translatable phrase (or each of a selected set of phrases) may be sequentially and automatically selected for the user to translate.

A translation interface may also include a mechanism for the user to enter translations for a currently selected translatable phrase. In the illustrated example, the served property includes a translation input window 402. As shown, the translation widow 402 has a translation input box 404 for the currently selected translatable phrase "My Contacts" 414a (for which a translation has been entered by the user). A virtual keyboard 406 may also be displayed for the user to use as a guide for typing characters for the particular language using their physical (ASCII) keyboard. When the user inputs a translation into input box 404, the user may then select the submit button 412 so that the translation is received by the UGT system.

The translation input window may also include an indication, e.g., 408, as to whether translations have been provided by other users (or the same user) for the selected phrase. As shown, the indicator 408 specifies that no translation have yet been provided for the "Your Contacts" phrase.

The translation window may also include a translate tab 410a (as shown in FIG. 4A), a statistics tab 410b for displaying statistics for a selected translatable phrase, and a preferences tab 410c for setting user preferences, such as which language to switch to, which language to set as the user's default translation language, whether the user would like to have a transliteration interface or a virtual keyboard by default, whether to present a dictionary look-up widget, whether to show a glossary explaining glossary terms that occur in the phrase being translated, etc.

Figure 5:
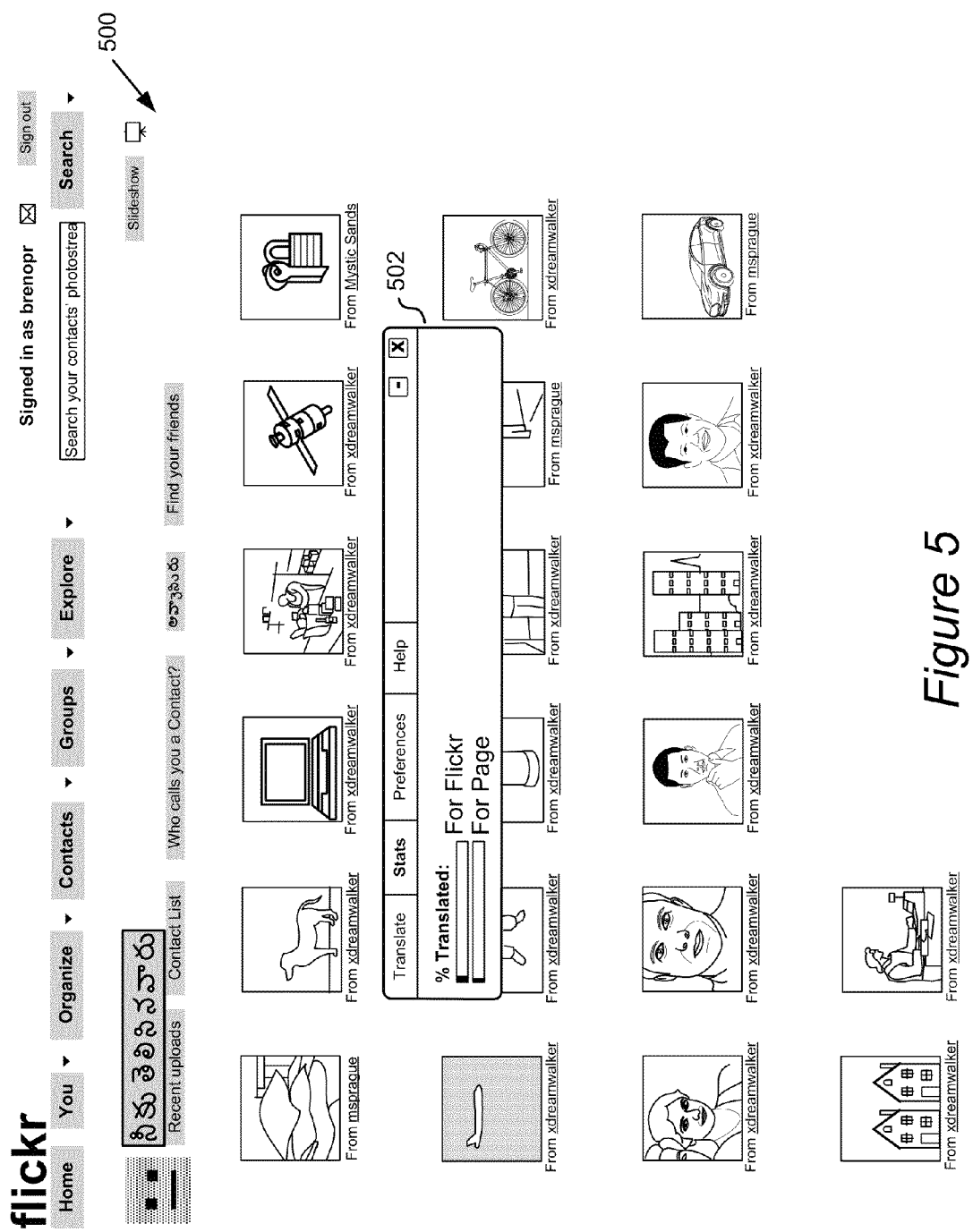
FIG. 5 is a screen shot illustrating selection of a statistics option for a particular served property in accordance with one embodiment.

FIG. 5 is a screen shot of the particular page 500 of a photo property illustrating selection of a statistics option for a particular served property in accordance with one embodiment. As shown, a statistics window 502 may be presented to the user when such user selects a statistics option (e.g., statistic tab 410b). This statistics window 502 indicates the percentage levels for the entire web property for the particular language and the particular displayed page. When a user selects the statistics option, the translation interface mechanism is configured to send a request, for example, to a UGT server, which then provides statistics information based on the translations that are retained for such web property and web page.

The translation interface for a set of translatable phrases of a served property may be provided in any suitable manner. Such translation interfaces may be rendered with a served web property based on instrumentation that is provided with such served property. For example, the response from the UGT-enabled property front end server may include UGT-centric attributes for each translatable string that specify the string's ID, source text (e.g., text specified in the original language that is being currently translated), and a position and type for each variable associated with the string. The response can also include scripts (e.g., JavaScript hooks) for rendering the translation interface based on such instrumentation. For example, the scripts can be configured to parse through the DOM (document object model) of the response to locate translatable phrases based on ID's that indicate such phrases are translatable. The located translatable phrases may then be rendered in a highlighted and selectable manner, e.g., as shown in FIG. 4A. Any suitable interface mechanism may be used to present translatable phrases and allow a user to translate such phrases.

Referring back to FIG. 3, each property server may include a resource manager (e.g., 308a or 308b) that is configured to provide localized resources, specifically text strings or phrases, for constructing a page. In a specific implementation, a resource manager locally stores translatable phrases and associates each translatable phrase with an identifier (ID) that specifies that such phrase is translatable. Different strings in different languages may also be associated with a particular ID. Each string may also be associated with instrumentation for providing a translation interface. Thus, when a page is being constructed, the resource manager may receive a call or request specifying a particular ID, in a certain language, and whether or not translation mode is activated. The resource manager may then provide the correct phrase, along with translation instrumentation (if translation mode is activated). Each ID may also be associated with a specified web property (e.g. Flickr) and retrieved phrases may also be based on the specified web property.

Referring back to the UGT procedure of FIG. 2, updated translations of strings of the served property may also be received from other users and such updated translations may be provided in context of the served property in operation 206. As shown in FIG. 4A, the served property 400 includes a translation 418 as a replacement for the "Contacts" translatable phrase.

A UGT-enabled property server may be configured to provide updated translations in any suitable manner. Referring to the example architecture of FIG. 3, each property server may also include a UGT subscriber module (e.g., 312a and 312b) for receiving updated translations from a centralized UGT server 323 that has access to one or more UGT databases 322. As each property front end server receives translations, such translations and corresponding instrumentation may be forwarded to the UGT server 323 for storage in one or more UGT databases 322. A UGT Publisher 324 of the UGT server 323 may be configured to publish updates of translations to the relevant property servers. Such updates may be triggered based on any suitable criteria. For example, an update may occur upon receipt of each translation, at a specified frequency, or when requested by a property server. In certain embodiments, published translations may be made available to all translators of a particular property, but only be publicly available to all users (e.g., non-translators) of a property after such translations first pass a vetting or review process as further described herein.

The UGT server 323 may also include a Web Service API for receiving translations from property servers, a web server 326 for providing server functionality, and a UGT Management module 324 for managing and analyzing received translations and providing translations and related information to property servers.

Referring back to FIG. 2, it may then be determined whether a translation for a selected text string of the served property has been received in operation 208. If a translation has been received, the original string may be associated with the translated string and the association may be retained for later review and use (if translated string passes verification) in operation 210. For example, the translation may be associated with the original string ID, a property identifier, a language identifier, and corresponding instrumentation and sent to a central UGT server for storage in a UGT database. A particular translation or phrase may be associated with a specific language by being stored in a particular database for such language. A particular translation or phrase may likewise be associated with a particular property.

Figure 4B:
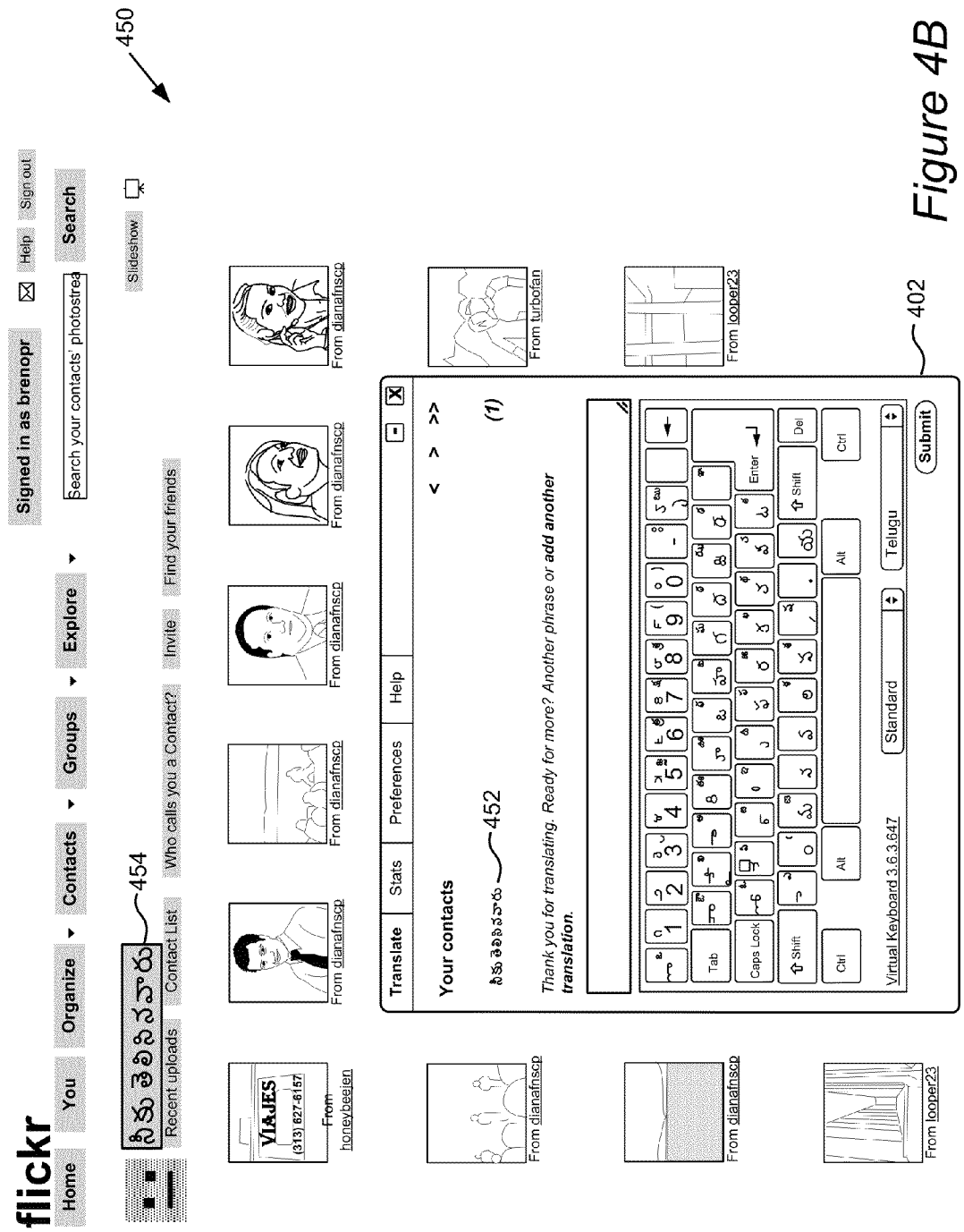
FIG. 4B is a screen shot illustrating a particular page of a photograph management and sharing property after a user has input a translation phrase in accordance with an example implementation.

The translated string may also be provided in context of the served property, along with the translation interface, (if translated string passes verification) in operation 212. FIG. 4B is a screen shot illustrating the particular page 450 of the web property Flickr after a user has input a translation phrase for the "Your Contacts" phrase. As shown, a user has entered the translation phrase 452 in translation window 402. The translation phrase 454 is then displayed in context and substituted for the English phrase "Your Contacts" 414a of FIG. 4A.

Figure 6:
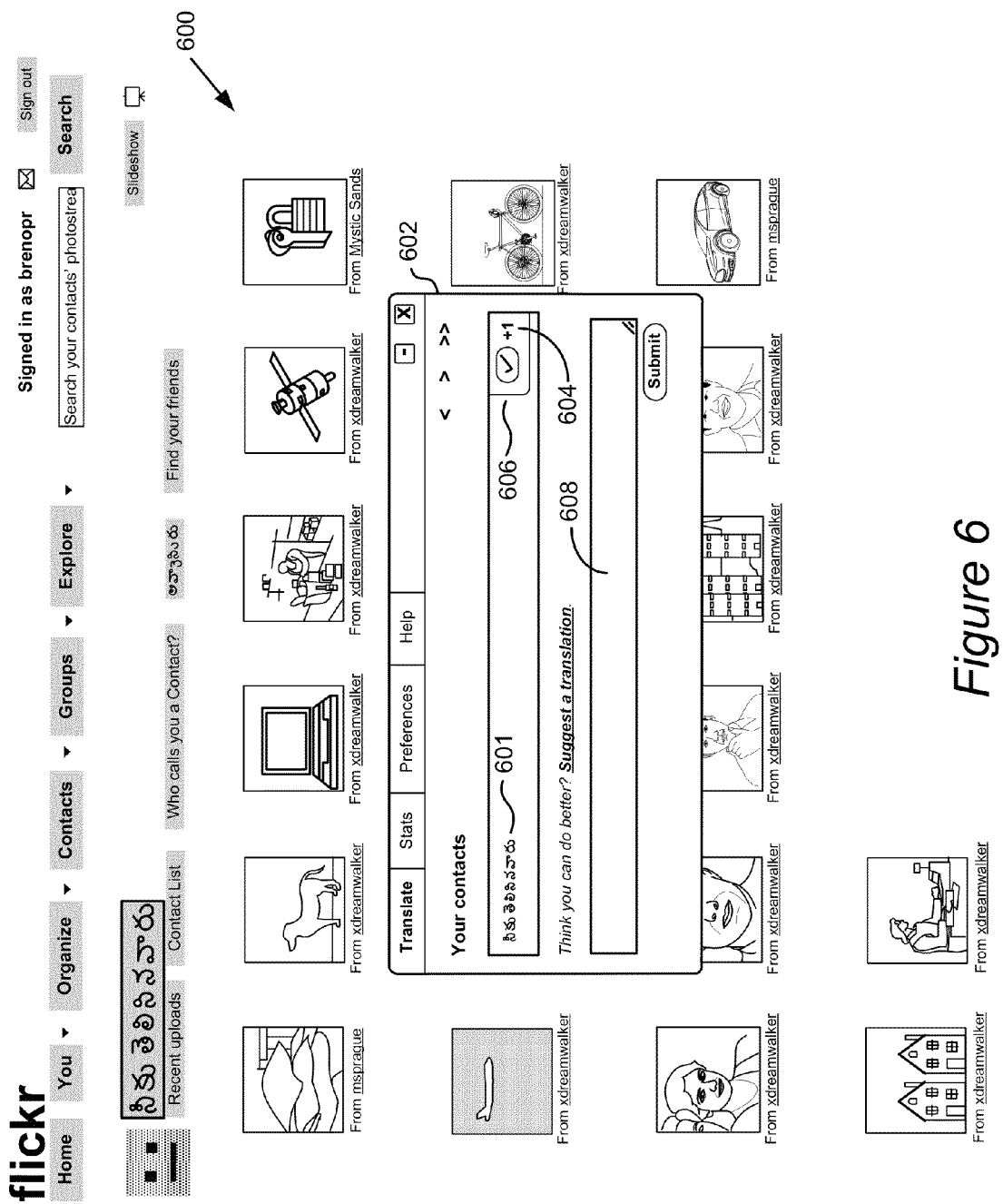
FIG. 6 is a screen shot of a particular page, including a voting mechanism, for a particular photo web property in accordance with a specific implementation.

A procedure for reviewing community translations (e.g., from other translators) may also be implemented with respect to the served property. For instance, translation updates from other users may be provided to the user of the web property. FIG. 6 is a screen shot of a home page, including a voting mechanism 602, for a particular photo web property in accordance with a specific implementation. As shown, the translation window 602 includes a translation phrase 601 for the selected translatable phrase "Your Contacts" that has been provided by the current user or other users. The window 602 also includes a vote mechanism 606 for the user to vote on the presented translation, a vote count 604 for indicating the current number of votes submitted for such translation, and an input box 608 for submitting a new translation. The illustrated vote count 604 equals "1" (after the user has voted for the particular translation).

In the illustrated embodiment of FIG. 2, it may be determined whether a vote for a submitted translation has been received in operation 216. When a vote is received, the submitted translation may also be associated with the received vote and such association may be retained for later review (by another translator user) and/or deployment use (e.g., by a property developer) in operation 218. For example, the submitted translation's ID is associated with the user's vote and forwarded to the UGT server. The UGT server can then provide a vote count for each submitted translation.

It may also be determined whether the user has ended the translation mode in operation 213. If the user ends the translation mode, the property may then be served without providing a translation interface for normal operation in step 214. Otherwise, translations for selected strings from the current user may continue to be collected and managed and translation updates may continue to be received and reviewed by the current user.

The instrumentation may be provided in any suitable format for identifying translatable phrases for providing translation mechanisms for a served web property (or for final deployment in a web property). Instrumentation may be associated with each submitted translation and retained for later use in rendering the translation in the served property. The instrumentation may be configured so as to not produce invalid HTML or compromise the stability of the rendered page. More often than not, properties use some sort of resource container mechanism to store the translatable phrases. Since this knowledge can be buried in an inner most layer, the decoration of phrases with instrumentation can preferably occur in this layer. However, phrases retrieved from this layer are usually passed though a series of formatting algorithms to produce the final output. The instrumentation is preferably formatted so as to pass through these layers without obstruction. Once the final phrases are merged to create a well-formed HTML document, the presence or absence of instrumentation preferably is formatted so as to not alter the appearance of the page, which may require changes to the property's style format, e.g., CSS (cascading style sheet).

In a specific implementation, phrases may first be wrapped in HTML comments with translation specific attributes (e.g., as provided to a resource manager) for later retrieval when constructing a web page that includes such phrases. Instrumentation for a simplified example phrase that does not include variables is provided as follows:

```
<-- ugt:start data-ugt-sid="B72A92DAAA1"
data-ugt-src="From your Contacts"-->Van uw Kontakten
<-- ugt:end-->
```

In this example, the ID is "B72A92DAAA1" is associated with the source text "From Your Contacts", and the translation "Van uw Kontakten". At the HTML page generation and assembly level, these comments can be converted into span tags and attributes without changing the appearance of the rendered HTML. The above instrumentation and corresponding phrase example may be converted into the following span element attributes-values and corresponding translation:

```
<span class="ugt-seg" data-ugt-sid="B72A92DAAA1" data-ugt-src="From your Contacts">
Van uw Kontakten!
</span>
```

When a translation pertains to one or more variables, the instrumentation includes information regarding how to handle such translation based on the specific variable values that are rendered for each web page of the particular property. For example, the instrumentation may specify the position and type of variable value with respect to the translation phrase. Additionally, certain translations may depend on particular variable values, such as whether a variable value is plural or singular, whether a variable value is masculine or feminine, and/or a count value.

When a user enters a translation for a translatable phrase that includes variables, the user can specify the position of such variables in the provided translation. For example, the user may be presented with movable translation input boxes that are initially positioned with respect to variable indicators. For the translatable phrase "Signed in as brenopr" of FIG. 4A, the user may be presented with a movable input box that is positioned to the left of the variable value "brenopr". The user may move the input box to the right of this variable if appropriate for the particular language translation. Alternatively, the user may be presented with a single input box and be required to specify variables in the form of tokens within the entered translation phrase. For example, the user may specify "Signed in as [user name]" for a submitted English translation.

In certain cases, the user may specify multiple translation choices for one or more variable values. Variable specific instrumentation may then be associated with the submitted translation. The following instrumentation example specifies three Dutch translation choices for three different "search results" variable values (0, 1, and greater than 1) that are found for a particular "search term" variable value. First, the instrumentation for three alternative submitted translations may be provided (e.g., to a resource manager) as follows:

```
<-- ugt:start data-ugt-sid="B72A92DAAA1"
data-ugt-src="Vond%20%7B0%2Cchoice%2C0%23geen%20resultaten
%7C1%23%E9%E9n%20resultaten%7D%20voor%20zoektermen%20%7
B1%7D"-->
    Vond <!-- ugt:arg:start data-ugt-pos="0" data-ugt-val="{0}" -->
    {0,choice,0#geen resultaten|1#één resultaat|1<vele resultaten}
    <!-- ugt:arg:end --> voor zoektermen <!-- ugt:arg:start data-ugt-pos="1"
data-ugt-val="{1}" -->{1}<!-- ugt:arg:end -->
    <!-- ugt:end -->
```

When this translation is being served in a particular requested web page and the count value equals "3" and the search term value equals "lion", this instrumentation may then be formatted by the property server as follows:

```
<-- ugt:start data-ugt-sid="B72A92DAAA1"
data-ugt-src="Vond%20%7B0%2Cchoice%2C0%23geen%20resultaten
%7C1%23%E9%E9n%20resultaten%7D%20voor%20zoektermen%20%7
B1%7D"-->
    Vond <!-- ugt:arg:start data-ugt-pos="0" data-ugt-val="3" -->
    vele resultaten
    <!-- ugt:arg:end --> voor zoektermen <!-- ugt:arg:start data-ugt-pos="1"
data-ugt-val="lion" -->lion<!-- ugt:arg:end -->
    <!-- ugt:end -->
```

This instrumentation may then be converted into the following instrumentation for final rending purposes (e.g., by the client browser):

```
<span ugt:start data-ugt-sid="DAAA1B72A92"
data-ugt-src="Vond%20%7B0%2Cchoice%2C0%23geen%20resultaten
%7C1%23%E9%E9n%20resultaten%7D%20voor%20zoektermen%20%7
B1%7D">
    Vond <span data-ugt-pos="0" data-ugt-val="3">vele resultaten</span>
voor zoektermen
    <span data-ugt-pos="1" data-ugt-val="lion">lion</span>
    </span>
```

Multiple translation choices may be collected from translator users in any suitable manner. For example, the translation interface may include a list of options for the user to selectively apply to a translation phrase that is entered by the user. For example, the options may allow the user to specify whether the current translation submission applies to a masculine and/or feminine version of a variable value. The options may allow the user to specify whether the current translation submission applies to a singular or plural variable value. If the user indicates only singular or plural, the user may then be asked to provide a translation for the other singular or plural variable option. If a count boundary is specified for the source translatable phrase, the user may be presented with such boundaries and asked to verify or edit such boundaries. The user may then be asked to provide translations for each count range.

Deployment of a particular property in a new language may then be based on the translations received by the UGT process from the community of translator users. The submitted translations may be reviewed (e.g., by a product developer or automated process) so as to select final translations for deployment. This review may be based at least in part on votes. The review may be triggered after a particular length of time and/or after all the translatable phrases have been translated for a particular property and language. The translations may also be run through a filtering mechanism to filter out words that have been predefined as offensive or spam.

A reputation score may be assigned to each translator user. Reputation may be based on votes received by such users, frequency or amount of translation activity, etc. During a deployment review, a user's translations may be weighted based on such user's reputation score. Additionally, a user may be allowed to review, approve, or filter translations when such user's reputation score reaches a certain level Translations may also be checked for consistency. Initial translations may be obtained for particular key words for a particular web property. When other translations are submitted, these submitted translations can be matched against the key word translations. For instance, if a particular translatable phrase includes one or more key words, the translation for such particular translatable phrase can be checked to determine whether such translation includes the initial translations for such key words. If the translation does not include required key translations, the translation may be discarded. Additionally, if certain translatable phrases are associated with one or more variables, translations for such certain translatable phrases may be checked to determine whether such translations include references to the required variables.

Figure 7:
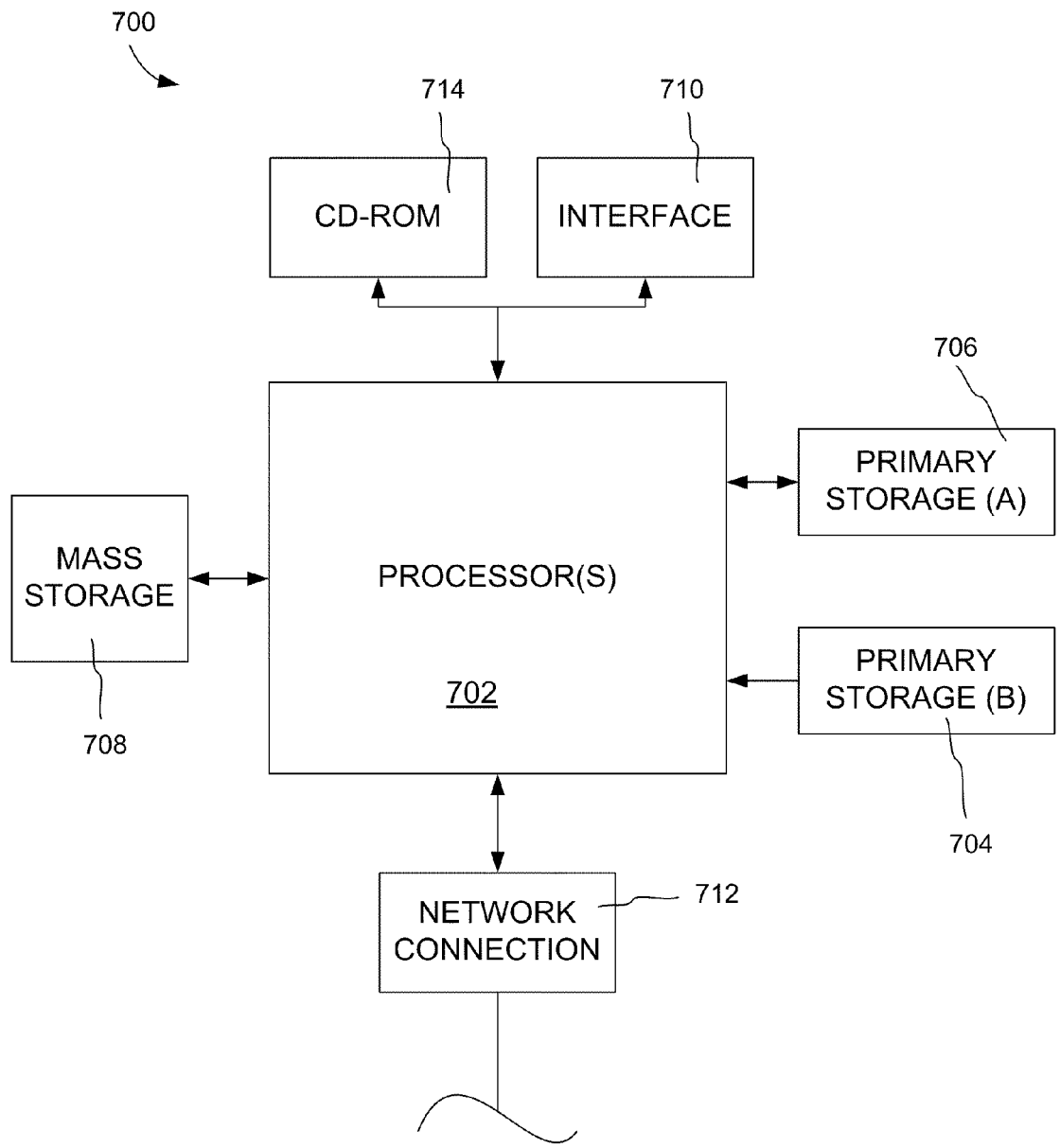
FIG. 7 illustrates an example computer system in which specific embodiments of the present invention may be implemented.

The techniques and system of the present invention may be implemented in any suitable hardware. FIG. 7 illustrates a typical computer system that, when appropriately configured or designed, can serve as a UGT system. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and non-programmable devices such as gate array ASICs or general-purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described herein. A mass storage device 708 is also coupled bi-directionally to CPU 702 and provides additional data storage capacity and may include any of the computer-readable media described herein. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store translation strings, instrumentation, source text strings, translation mode settings, user information, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
    receiving an indication of a user using a particular web property;
    determining that the user is authorized to provide translations for such particular web property;
    transmitting one or more web pages of the particular web property, the one or more web pages including a plurality of translatable text strings and a translation interface for receiving translations of the translatable text strings in a context of the one or more web pages of the particular web property, wherein the translation interface includes a list of options;
    receiving a first translation of a first one of the translatable text strings into a first language entered by the user in the translation interface in the context of the one or more web pages of the particular web property;
    receiving a selection of an option in the list of options to indicate whether the first translation is applied to a masculine or feminine version of a variable value or to indicate whether the first translation is applied to a plural or singular version of the variable value; and
    transmitting the first translation such that the first translatable text string is replaced with the first translation within the one or more web pages of the particular web property.

2. The method as recited in claim 1, further comprising in response to receiving the first translation, sending the first translation to a central server that is configured to store the first translation in association with the first one of the translatable text strings and the particular web property, and configured to publish the first translation to other users of the particular web property.

3. The method as recited in claim 1, further comprising, in response to receiving a request for reviewing other translations of a second one of the translatable text strings within the context of the one or more web pages of the particular web property from other users into the first language, providing a response for presenting the other translations through the translation interface, the other translations being associated with the second one of the translatable text strings and the particular web property.

4. The method as recited in claim 3, wherein the translation interface is further configured to receive a vote for a selected one of the other translations as being a best translation for the second translatable text string within the context of the one or more web pages of the particular web property.

5. The method as recited in claim 1, further comprising, in response to the user using the particular web property, wherein such user is authorized to provide translations for such particular web property, providing a response for presenting a second translation for a second one of the translatable text strings as a replacement for the second translatable text string within the one or more web pages, wherein the second translation is a best translation of a plurality of translations, provided by a plurality of users of the particular web property, for the second one of the translatable text strings within the context of the one or more web pages of the particular web property.

6. The method as recited in claim 5, wherein the second translatable text string is associated with a variable and the second translation is based at least in part on a current value of the variable for the one or more web pages.

7. The method as recited in claim 6, wherein the response for presenting the second translation includes a plurality of alternative translation strings, a position and type indicator for the current value of the variable, and information that specifies which alternative translation string to present as the second translation based at least in part on the current value of the variable.

8. An apparatus comprising at least a processor and a memory, wherein the processor and/or memory are configured to perform the following operations:
    receiving an indication of a user using a particular web property;
    determining that the user is authorized to provide translations for such particular web property;
    transmitting one or more web pages of the particular web property, the one or more web pages including a plurality of translatable text strings and a translation interface for receiving translations of the translatable text strings in a context of the one or more web pages of the particular web property, wherein the translation interface includes a list of options;
    receiving a first translation of a first one of the translatable text strings into a first language entered by the user in the translation interface in the context of the one or more web pages of the particular web property;
    receiving a selection of an option in the list of options to indicate whether the first translation is applied to a masculine or feminine version of a variable value or to indicate whether the first translation is applied to a plural or singular version of the variable value; and transmitting the first translation such that the first translatable text string is replaced with the first translation within the one or more web pages of the particular web property.

9. The apparatus as recited in claim 8, wherein the processor and/or memory are configured for, in response to receiving the first translation, sending the first translation to a central server that is configured to store the first translation in association with the first translatable text string and the particular web property, and configured to publish the first translation to other users of the particular web property.

10. The apparatus as recited in claim 8, wherein the processor and/or memory are configured for, in response to receiving a request for reviewing other translations of a second one of the translatable text strings within the context of the one or more web pages of the particular web property from other users into the first language, providing a response for presenting the other translations through the translation interface, the other translations being associated with the second one of the translatable text strings and the particular web property.

11. The apparatus as recited in claim 10, wherein the translation interface is further configured to receive a vote for a selected one of the other translations as being a best translation for the second translatable text string within the context of the one or more web pages of the particular web property.

12. The apparatus as recited in claim 8, wherein the processor and/or memory are configured for, in response to the user using the particular web property, wherein such user is authorized to provide translations for such particular web property, providing a response for presenting a second translation for a second one of the translatable text strings as a replacement for the second translatable text string within the one or more web pages, wherein the second translation is a best translation of a plurality of translations, provided by a plurality of users of the particular web property, for the second one of the translatable text strings within the context of the one or more web pages of the particular web property.

13. The apparatus as recited in claim 12, wherein the second translatable text string is associated with a variable and the second translation is based at least in part on a current value of the variable for the one or more web pages.

14. The apparatus as recited in claim 13, wherein the response for presenting the second translation includes a plurality of alternative translation strings, a position and type indicator for the current value of the variable, and information that specifies which alternative translation string to present as the second translation based at least in part on the current value of the variable.

15. At least one non-transitory computer readable storage medium having computer program instructions stored thereon that are arranged to perform the following operations:
receiving an indication of a user using a particular web property;
determining that the user is authorized to provide translations for such particular web property;
transmitting one or more web pages of the particular web property, the one or more web pages including a plurality of translatable text strings and a translation interface for receiving translations of the translatable text strings in a context of the one or more web pages of the particular web property, wherein the translation interface includes a list of options;
receiving a first translation of a first one of the translatable text strings into a first language entered by the user in the translation interface in the context of the one or more web pages of the particular web property;
receiving a selection of an option in the list of options to indicate whether the first translation is applied to a masculine or feminine version of a variable value or to indicate whether the first translation is applied to a plural or singular version of the variable value; and
transmitting the first translation such that the first translatable text string is replaced with the first translation within the one or more web pages of the particular web property.

16. The at least one non-transitory computer readable storage medium as recited in claim 15, wherein the computer program instructions stored thereon that are further arranged for, in response to receiving the first translation, sending the first translation to a central server that is configured to store the first translation in association with the first translatable text string and the particular web property, and configured to publish the first translation to other users of the particular web property.

17. The at least one non-transitory computer readable storage medium as recited in claim 15, wherein the computer program instructions stored thereon that are further arranged for, in response to receiving a request for reviewing other translations of a second one of the translatable text strings within the context of the one or more web pages of the particular web property from other users into the first language, providing a response for presenting the other translations through the translation interface, the other translations being associated with the second one of the translatable text strings and the particular web property.

18. The at least one non-transitory computer readable storage medium as recited in claim 17, wherein the translation interface is further configured to receive a vote for a selected one of the other translations as being a best translation for the second translatable text string within the context of the one or more web pages of the particular web property.

19. The at least one non-transitory computer readable storage medium as recited in claim 15, wherein the computer program instructions stored thereon that are further arranged for, in response to the user using the particular web property, wherein such user is authorized to provide translations for such particular web property, providing a response for presenting a second translation for a second one of the translatable text strings as a replacement for the second translatable text string within the one or more web pages, wherein the second translation is a best translation of a plurality of translations, provided by a plurality of users of the particular web property, for the second one of the translatable text strings within the context of the one or more web pages of the particular web property.

20. The at least one non-transitory computer readable storage medium as recited in claim 19, wherein the second translatable text string is associated with a variable and the second translation is based at least in part on a current value of the variable for the one or more web pages.

21. The at least one non-transitory computer readable storage medium as recited in claim 20, wherein the response for presenting the second translation includes a plurality of alternative translation strings, a position and type indicator for the current value of the variable, and information that specifies which alternative translation string to present as the second translation based at least in part on the current value of the variable.

22. The method as recited in claim 1, wherein the plurality of translatable text strings are highlighted to indicate that they are translatable.

23. The method as recited in claim 1, further comprising:
receiving a selection of one of the plurality of translatable text strings within the one or more web pages; and
in response to receiving the selection of the one of the plurality of translatable text strings, presenting the translation interface for receiving translations of the selected one of the translatable text strings in the context of the one or more web pages of the particular web property.

24. The method as recite in claim 1, further comprising:
providing an indication as to whether translations have previously been provided by users for the first one of the translatable text strings in association with the particular web property.

* * * * *